US009873229B2

(12) United States Patent
Chun et al.

(10) Patent No.: US 9,873,229 B2
(45) Date of Patent: Jan. 23, 2018

(54) THREE-DIMENSIONAL OBJECT DEVELOPMENT

(71) Applicant: Hankookin, Inc., Raleigh, NC (US)

(72) Inventors: James Jiwen Chun, Raleigh, NC (US); Andrew Youngho Chun, Raleigh, NC (US); Angela Soyoung Chun, Raleigh, NC (US); Jennifer Miseong Chun, Raleigh, NC (US)

(73) Assignee: HANKOOKIN, INC., Raleigh, NC (US)

( * ) Notice: Subject to any disclaimer, the term of this patent is extended or adjusted under 35 U.S.C. 154(b) by 602 days.

(21) Appl. No.: 14/547,123

(22) Filed: Nov. 18, 2014

(65) Prior Publication Data

US 2015/0142153 A1 May 21, 2015

Related U.S. Application Data

(60) Provisional application No. 61/906,908, filed on Nov. 21, 2013.

(51) Int. Cl.
*B29C 67/00* (2017.01)
*B29C 64/386* (2017.01)
(Continued)

(52) U.S. Cl.
CPC ........ *B29C 67/0088* (2013.01); *B29C 64/386* (2017.08); *B29C 64/40* (2017.08);
(Continued)

(58) Field of Classification Search
None
See application file for complete search history.

(56) References Cited

U.S. PATENT DOCUMENTS 8,175,734 B2    5/2012  Fogel et al.
2009/0174709 A1*  7/2009  Kozlak ............... B29C 67/0055
345/420

(Continued)

FOREIGN PATENT DOCUMENTS

EP         EP2537642 A1    12/2012
EP         WO2013050525 A1  4/2013
WO         WO2013036942 A1  3/2013

*Primary Examiner* — Moustapha Diaby
(74) *Attorney, Agent, or Firm* — Ash Tankha; Lipton, Weinberger, Husick

(57) ABSTRACT

A computer implemented method and an object development system (ODS) for developing a three-dimensional (3D) object are provided. The ODS receives a 3D image in one or more image formats from one or more sources. The ODS determines object development requirements and a display type of the received 3D image. The ODS creates a support structure based on the object development requirements and the display type. The support structure includes one or more branching elements movably attached to each other and/or a support element for facilitating movement in the 3D object. The ODS fits the received 3D image on the support structure and constructs a multi-layered volumetric 3D image therefrom. The ODS segments the multi-layered volumetric 3D image into multiple 3D printable units. The ODS transmits the 3D printable units to one or more 3D printing devices for printing each 3D printable unit for assembling and developing the 3D object.

29 Claims, 9 Drawing Sheets

(51) Int. Cl.
*B29C 64/40* (2017.01)
*G06F 17/50* (2006.01)
(52) U.S. Cl.
CPC .......... *G06F 17/50* (2013.01); *G06F 2217/12* (2013.01); *Y02P 90/265* (2015.11)

(56) References Cited

U.S. PATENT DOCUMENTS

| | | | |
|---|---|---|---|
| 2012/0194852 A1* | 8/2012 | Chen | G06F 3/1203 358/1.15 |
| 2012/0232857 A1 | 9/2012 | Fisker et al. | |
| 2014/0162033 A1* | 6/2014 | Giller | B29C 67/0051 428/207 |
| 2015/0057784 A1* | 2/2015 | Butler | B29C 67/0088 700/119 |

* cited by examiner

THREE-DIMENSIONAL OBJECT DEVELOPMENT

CROSS REFERENCE TO RELATED APPLICATIONS

This application claims priority to and the benefit of provisional patent application No. 61/906,908 titled "Three-dimensional Object Development", filed in the United States Patent and Trademark Office on Nov. 21, 2013. The specification of the above referenced patent application is incorporated herein by reference in its entirety.

BACKGROUND

Three-dimensional (3D) printing, also referred to as "additive manufacturing", is a process of printing 3D objects from a digital representation, for example, a computer-aided design (CAD) model of a 3D object, using a 3D printer. A typical 3D printer 3D prints an object by laying down 3D printing material, for example, thermoplastics such as polylactic acid (PLA), acrylonitrile butadiene styrene (ABS), ceramic materials, metal alloys, etc., layer by layer. 3D printing technology has applications in many fields, for example, architecture, construction, industrial design, the automotive industry, aerospace, military, engineering, dental and medical industries, education, etc. However, typical 3D printing materials are costly for a median income bracket person. Typically, 3D printing large objects requires large amounts of 3D printing material, thereby making 3D printing costly for domestic use. The cost of 3D printing and manufacturing can be reduced by optimizing the amount of 3D printing material used for 3D printing a 3D object. One method to reduce material usage in 3D printing is modeling hollow objects that can be supported on an inner frame that provides substantial support to the hollow 3D printed objects. However, there is a dearth of user-friendly software and applications that allow users to 3D print and manufacture hollow 3D objects that are supported on inner frames. There is a need for a computer implemented method and system that enables cost effective 3D printing of large objects by using substantially less 3D printing material without compromising structural strength of a 3D printed object.

There is a huge demand for custom design manufacturing, since a conventional mass production process is costly for manufacturing custom designed products. In custom design manufacturing, service providers produce three-dimensional (3D) objects based on orders received from customers for 3D printing customized objects via online design customization software and websites. Although 3D printing technology reduces the time and cost for manufacturing custom designed products, the applications of 3D printing technology are limited by printable size concerns and printing material selection options for the custom designed products. Thus, expanding the applications of 3D printing technology in the custom design manufacturing field requires a systemic approach and methodology that can allow a median income bracket person to produce custom designed products at a low cost with predictable results. Therefore, there is a need for a computer implemented method and system that allows efficient and effective custom design manufacturing of 3D printed objects.

Typically, large three-dimensional (3D) objects are composed of independent parts that can be mechanically engaged with each other. Similar to manufacturing and development of assembled furniture, if a large 3D object comprising multiple parts can be developed by 3D printing each part and assembling the 3D printed parts, then typical transportation and manufacturing process predicaments involved in mass production of large 3D objects can be simplified and overcome. The precision in 3D designing and printing offers the potential to utilize a process similar to manufacturing and development of assembled furniture to develop a 3D object through a systemic method, a software development process, and a printing process. The 3D printing industry has provided an average income person with a variety of desktop 3D printers that are used to 3D print objects at home. However, conventional desktop 3D printers comprise a substantially smaller build area, thereby limiting sizes of 3D printable objects. Hence, a user can only print substantially small sized objects using conventional desktop 3D printers. With the popularity of precision home use 3D printing, a printing mechanism for developing 3D objects of any size can substantially increase the applications of home use 3D printers. There is a need for a computer implemented method and system that enables 3D printing of large 3D objects by 3D printing parts of the large 3D object and then assembling the 3D printed parts to build the large 3D object.

Hence, there is a long felt but unresolved need for a computer implemented method and system that builds or develops a large three-dimensional (3D) object using small 3D printed units that can be assembled on a support structure, and that allows efficient and effective custom design manufacturing of 3D printed objects. Furthermore, there is a need for a computer implemented method and system that cost effectively 3D prints a large object by using substantially less 3D printing material without compromising structural strength of the 3D printed object.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The computer implemented method and system disclosed herein addresses the above stated need for building or developing a large three-dimensional (3D) object using small 3D printed units that can be assembled on a support structure, thereby allowing efficient and effective custom design manufacturing of 3D printed objects. The 3D object is, for example, a commercial use object such as a human size sculpture, a 3D gift item, a 3D photograph, a 3D mask, a 3D picture, a household item, a decorative item, a 3D toy, an educational object such as a 3D artistic creation, etc. Furthermore, the computer implemented method and system disclosed herein addresses the above stated need for cost effectively 3D printing a large object by using substantially less 3D printing material without compromising structural strength of the 3D printed object. The computer implemented method and system disclosed herein develops a 3D object of any size and shape by segmenting a multi-layered volumetric 3D image of a large 3D object into small 3D printable units, configuring a support structure for assembling the small 3D printed units, and facilitating assembly of the small 3D printed units on the support structure to develop the large 3D object.

The computer implemented method disclosed herein employs an object development system comprising at least one processor configured to execute computer program instructions for developing a three-dimensional (3D) object.

The object development system receives a 3D image in one or more of multiple image formats from one or more of multiple sources. The object development system converts the received 3D image into smaller printable units that can be assembled into a full size 3D object as follows. The object development system determines object development requirements and a display type of the received 3D image by analyzing the received 3D image. The object development system creates a support structure for the 3D object based on the determined object development requirements and the display type of the received 3D image. The object development system fits the received 3D image on the created support structure. The object development system constructs a multi-layered volumetric 3D image from the received 3D image fitted on the created support structure. The object development system segments the constructed multi-layered volumetric 3D image into multiple 3D printable units. The object development system transmits the 3D printable units to one or more 3D printing devices. One or more 3D printing devices print each of the 3D printable units for assembling and developing the 3D object. A user can assemble the 3D printable units printed by one or more 3D printing devices on a printed support structure to build the 3D object.

In one or more embodiments, related systems include but are not limited to circuitry and/or programming for effecting the methods referenced herein; the circuitry and/or programming can be virtually any combination of hardware, software, and/or firmware configured to effect the herein-referenced methods depending upon the design choices of a system designer. Also, various structural elements may be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing carries over to the description of that method step or structure shown by that same numeral in any subsequent drawing herein.

DETAILED DESCRIPTION OF THE INVENTION

Figure 1:
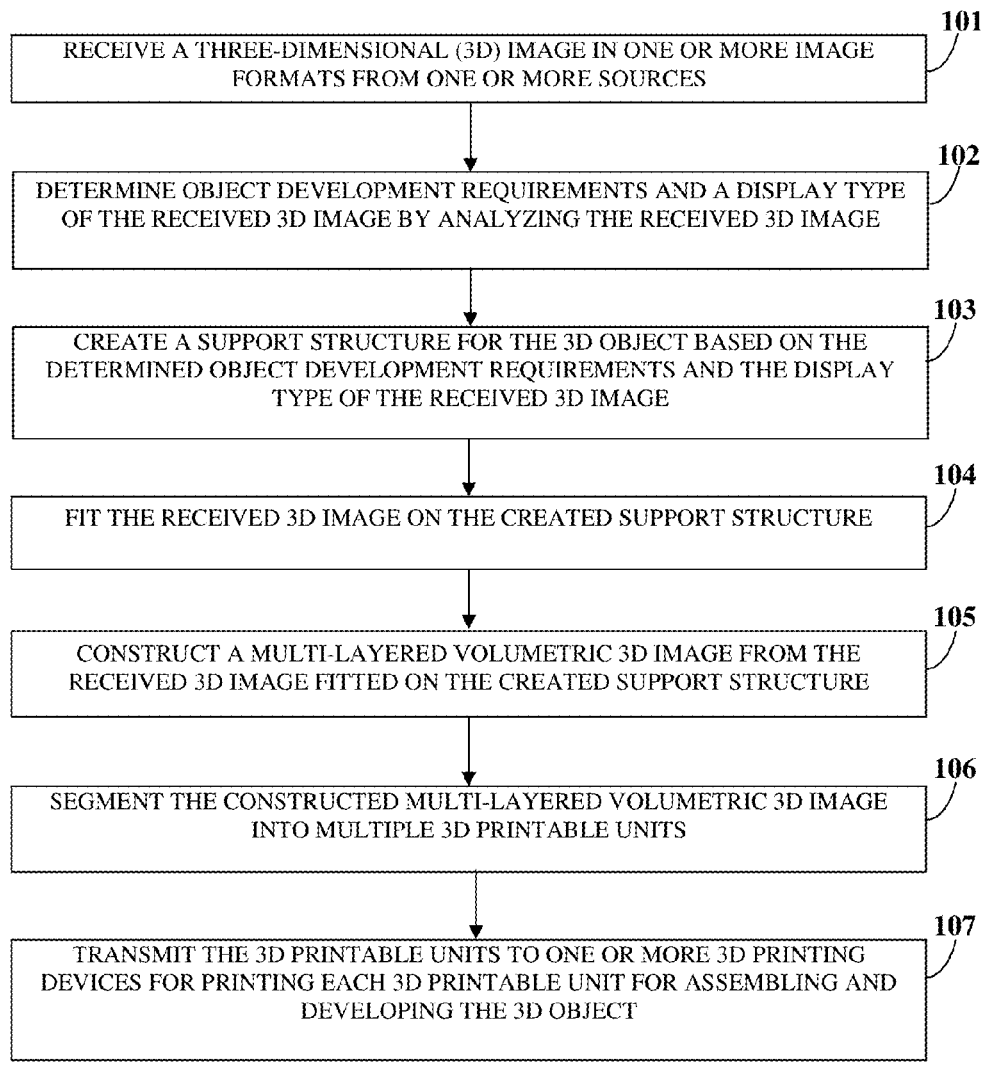
FIG. 1 illustrates a computer implemented method for developing a three-dimensional object.

FIG. 1 illustrates a computer implemented method for developing a three-dimensional (3D) object. The computer implemented method disclosed herein comprises a disassembling and assembling process that can help reduce cost, and improve quality and efficiency of custom design manufacturing processes of 3D objects. The computer implemented method disclosed herein is used to develop, for example, artistic sculptures and products that are substantially large, require high weighted designs, and are typically difficult to be custom designed and printed using a conventional 3D printer. The computer implemented method disclosed herein employs an object development system comprising at least one processor configured to execute computer program instructions for developing a 3D object. The 3D object is, for example, a commercial use object such as a human size sculpture or another 3D sculpture, a 3D automobile, an air drone, furniture, a house, a 3D gift item, a 3D photograph, a 3D mask, a 3D picture, a household item, a decorative item, a 3D toy, an educational object such as a 3D artistic creation, etc. In the computer implemented method disclosed herein, the object development system receives 101 a 3D image in one or more image formats from one or more sources. The image formats comprise, for example, an object (obj) file format, stereolithography (STL) file format, etc., which can be converted into image formats that can be printed using 3D printing devices, for example, 3D printers. The sources comprise, for example, a design software such as 3DS MAX® of Autodesk, Inc., a 3D scanning software such as NextEngine® of NextEngine, Inc., a software that generates 3D images from two dimensional images such as Facial Studio of Di-O-Matic, Inc., Rhinoceros® 3D of TLM, Inc., DBA Robert McNeel and Associates, etc.

The object development system determines 102 object development requirements and a display type of the received three-dimensional (3D) image by analyzing the received 3D image, for example, based on functional, geometrical, dimensional, structural, strength, esthetic or artistic, and mobility parameters of the 3D object. As used herein, "object development requirements" refer to requirements and attributes that need to be incorporated in developing a 3D object from a 3D printing device, for example, based on functional, structural, esthetic or artistic and other features of the 3D object. Also, as used herein, "display type" refers to a type of representation of a three-dimensional (3D) object in a 3D space. The display type comprises, for example, an unsupported type, a supported type, a standing type, etc. The unsupported type represents, for example, an individual object such as a 3D mask and any unsupported 3D object. The supported type represents, for example, an object having a baseboard support structure such as a 3D photograph. The standing type represents, for example, a standing sculpture such as a 3D sculpture.

The object development system employs software programming components such as programming tools, software programs codes, algorithms, etc., to analyze the received three-dimensional (3D) image based on different analytical parameters for determining the object development requirements and the display type of the received 3D image. The object development system, for example, functionally, structurally, and artistically analyzes a 3D image of an entire 3D object to determine object development requirements comprising, for example, functional requirements, structural requirements, esthetic or artistic requirements, mobility requirements, etc., for development of the 3D object. The object development system determines functional requirements comprising, for example, incorporation of functional features such as an electronic part, an electrical part, etc., in a 3D object. The object development system determines structural requirements comprising, for example, shape, geometry, size or dimensions of the 3D object, physical strength required in each component of the 3D object, materials for building one or more components of the 3D object, etc. The object development system selects strong materials such as metals that can be cast or milled with 3D design technology for building the components of the 3D object. The object development system determines esthetic or artistic requirements comprising, for example, colors, shades, texture requirements, etc., of the 3D object, for improving and enhancing an artistic appearance of the 3D object. The object development system determines mobility requirements comprising, for example, incorporation of mobile parts in the 3D object. In an embodiment, the object development system notifies a user about the determined object development requirements for material selection for printing and developing the 3D object.

The object development system creates 103 a support structure for the three-dimensional (3D) object based on the determined object development requirements and the display type of the received 3D image. As used herein, "support structure" refers to a 3D structural image of an internal frame of a 3D object. 3D printed units of an object can be assembled on a 3D printed support structure. The object development system employs software programming components such as programming tools, software programs codes, algorithms, etc., to create the support structure for the 3D object. The object development system creates the support structure as an inner structural frame, which after being 3D printed, can support the 3D object and maintain overall physical strength, for example, against any external force applied to the 3D object, wear and tear, and other destabilizing factors against the 3D object. The 3D printed support structure provides structural strength to an assembled 3D object. The object development system configures the support structure for minimal printing material usage and maximal strength. The support structure is configured, for example, as a metal frame, a baseboard structure, a complex metal frame with branches, a metal stand, a support base, etc., to provide support to the 3D object. For example, if an object comprises a baseboard structure, the object development system creates the baseboard structure for the 3D object based on the shape, size, and dimensions of the baseboard structure. In this example, the weight of the entire 3D object is balanced at the center of the baseboard structure.

In an embodiment, the created support structure comprises one or more branching elements movably attached to a support element and/or to each other for facilitating movement in the three-dimensional (3D) object. As used herein, "branching elements" refer to branches or arms added to a support element of the support structure for providing additional support during assembly of a 3D object on a 3D printed support structure. The branching elements are, for example, configured as arm branches of the created support structure. Also, as used herein, "support element" refers to a base element of a 3D object that provides a base during assembly of the 3D object. Other structural elements of the 3D object are assembled on the support element. Once the branching elements and the support element of the support structure are printed using a 3D printing device, the printed branching elements and the printed support element are movably attached to each other using one or more connecting elements, for example, hinges that allow the printed branching elements to move around the connecting elements. As used herein, "connecting element" refers to any suitable component, for example, a groove, a hinge, a screw, a 3D fitting plug, a magnet, a cross bar, a dent, a wedge, etc., used to attach printed branching elements to each other and/or to a printed support element. For example, to develop a complex 3D object, branching elements shaped as spines are configured in the support structure. In an embodiment, the object development system configures one or more branching elements on the support structure based on the complexity of the 3D object.

In an embodiment, the connecting elements are used during assembling and building of the three-dimensional (3D) object. The connecting elements are used to engage small 3D printed units with each other and/or with large 3D printed units to create large 3D objects. For example, in the case of a standing sculpture with a baseboard structure, the object development system creates a support structure that can be 3D printed as a metal frame using a metal printing material. The 3D object, that is, the standing sculpture can be engaged with the 3D printed metal frame by inserting connecting elements, for example, screws through the baseboard structure of the 3D object. In this example, the weight of the entire standing sculpture is balanced at the center of the baseboard structure. In an embodiment, the metal frames can be 3D printed and manufactured using commercial 3D manufacturing techniques, for example, 3D metal casting, 3D metal milling, 3D metal printing, 3D metal machining, etc., in large quantities.

In an embodiment, the object development system configures the support structure to incorporate one or more of multiple control mechanisms in the created support structure. As used herein, "control mechanism" refers to one or more motion control elements that generate and control movement of one or more movable parts of a three-dimensional (3D) object. The control mechanisms comprise, for example, mechanical motion control elements, electrical motion control elements, electronic motion control elements, etc. The control mechanisms facilitate movement of the 3D object. The object development system configures the support structure to incorporate control mechanisms such as motors, mobile and motorized structures, and electronic control mechanisms for generating and controlling movements of the 3D object based on programmed electronic signals. The motors can be incorporated into mobile parts of the 3D object during the assembly stage to allow motorized movements of the mobile parts. Electronic control mechanisms can be interfaced with the motors to generate automated movements in the 3D object. For example, in the case of 3D mannequins, motors and electronic control mechanisms incorporated within a metal frame generate movements in the arms of the 3D mannequins based on the programmed electronic signals. In another embodiment, the object development system configures the support structure to incorporate multiple electronic components in the created support structure. The electronic components comprise, for example, electronic viewing devices, electronic hearing devices, electronic aiming devices, electronic fans, and other electronic components that can be added to a printed support structure to create a multifunctional 3D object, for example, a high technology face helmet or a high technology mask.

After creation of the support structure, the object development system fits 104 the received three-dimensional (3D) image on the created support structure, for example, over a baseboard structure or a stand. The object development system employs software programming components such as programming tools, software programs codes, algorithms, etc., to fit the received 3D image on the created support structure. The object development system fits the received 3D image on the created support structure to ensure that once a 3D object is assembled on a printed support structure, the printed support structure is capable of structurally supporting the 3D object and maintaining structural integrity of the 3D object.

The object development system constructs 105 a multi-layered volumetric three-dimensional (3D) image from the received 3D image fitted on the created support structure. The multi-layered volumetric 3D image is configured as a shell layered image. The object development system employs software programming components such as programming tools, software programs codes, algorithms, etc., to construct the multi-layered volumetric 3D image. In an embodiment, the object development system constructs the multi-layered volumetric 3D image, for example, by executing geometrical division algorithms, structural division algorithms, functional division algorithms, etc. For example, the object development system constructs a multi-layered volumetric 3D image by executing a geometrical division algorithm that divides a 3D image of an object into multiple shell layers based on a shape of the object, such that structural stability of the printed object is maintained by printed shell layers of the printed object. The multi-layered volumetric 3D image comprises 3D image data that defines the volume of the 3D object rather than just a 3D surface of the 3D object. The 3D image data comprises, for example, volumetric data used in 3D printing. In the shell layer, the object development system adds a minimum of, for example, 2 layers to 3 layers of blocks to maintain structural strength of the 3D object to be developed.

The object development system segments 106 the constructed multi-layered volumetric three-dimensional (3D) image into multiple 3D printable units. As used herein, "3D printable units" refer to images of multiple basic units or blocks that, once printed by a 3D printing device, can be assembled together to build a 3D object. The object development system defines a segmentation pattern for the multi-layered volumetric 3D image of a 3D object. In an embodiment, the object development system segments the constructed multi-layered volumetric 3D image into small 3D printable units based on a division algorithm executed by the object development system. For example, the object development system segments the constructed multi-layered volumetric 3D image by executing geometrical division algorithms as exemplarily illustrated in FIGS. 6A-6B, or functional division algorithms and/or structural division algorithms as exemplarily illustrated in FIGS. 7A-7B. The geometrical division algorithms instruct the object development system to perform a regular shaped division of the constructed multi-layered volumetric 3D image with consideration to structural stability, for example, similar to stacking bricks. By setting a size and boundaries of the 3D printable units, the geometrical division algorithms program the object development system to perform the division of the constructed multi-layered volumetric 3D image in a single operation. The functional division algorithms and/or the structural division algorithms executed by the object development system divide the constructed multi-layered volumetric 3D image into 3D printable units of irregular shapes based on details or characteristics of the 3D object, with individual considerations to each irregular shape and region of each 3D printable unit. The object development system divides each 3D printable unit of each irregular shape into layers with irregular shapes and thicknesses, which require multiple operations.

The object development system employs software programming components such as programming tools, software programs codes, algorithms, etc., to segment the constructed multi-layered volumetric three-dimensional (3D) image into multiple 3D printable units. In an embodiment, the object development system segments the constructed multi-layered volumetric 3D image free of the created support structure. In this embodiment, the object development system segments only the constructed multi-layered volumetric 3D image into multiple 3D printable units, which are 3D printed, while the created support structure is developed using conventional 3D manufacturing technologies such as milling, casting, etc. The 3D printable units that are 3D printed are hereafter referred to as "3D printed units". The 3D printed units are assembled to develop the 3D object. The 3D object is then positioned on the developed support structure. The object development system divides the constructed multi-layered volumetric 3D image into 3D printable units based on printable dimensions and a type of 3D printing device, for example, a 3D printer such as MakerBot® of MakerBot Industries, LLC, Cube® of 3D Systems, Inc., etc., used by a user. In an embodiment, after the object development system determines all the object development requirements, the object development system employs 3D design software to divide the constructed multi-layered volumetric 3D image of the 3D object into 3D printable units of small sizes that can be printed by a 3D printing device. The 3D printable units can be, for example, dissimilar printable units 406a, 406b, 502, etc., exemplarily illustrated in FIG. 4, FIGS. 5A-5C, and FIGS. 6A-6B, or self-similar printable units 707 exemplarily illustrated in FIGS. 7B-7C. The 3D printable units are of multiple shapes, for example, a cubical shape, a tetrahedral shape, a cylindrical shape, a spherical shape, any irregular 3D shape, etc. Once the 3D printable units are printed by a 3D printing device, the 3D printed units can be fitted into each other like a 3D puzzle during assembly of the large 3D object. The object development system divides the constructed multi-layered volumetric 3D image of a large sized 3D object into multiple small 3D printable units, for example, by a factor of 2. These 3D printable units have different shapes and sizes that once printed by a 3D printing device can be assembled to build large 3D objects.

In an embodiment, the object development system configures one or more connection grooves in each of the three-dimensional (3D) printable units. The connection grooves facilitate insertion of one or more connecting elements, as exemplarily illustrated in FIGS. 6A-6B, for assembling and securing each of the 3D printed units on a created and manufactured support structure.

Figure 4:
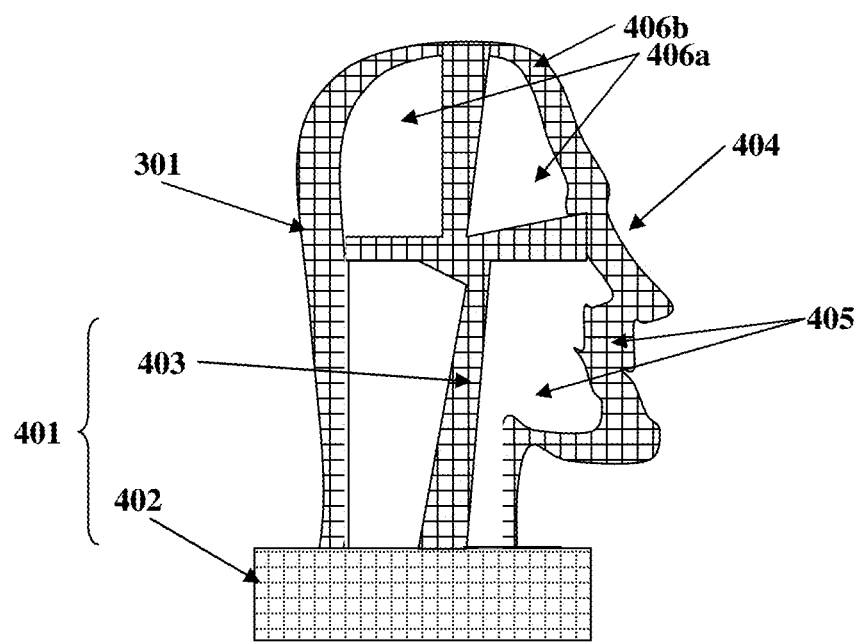
FIG. 4 exemplarily illustrates a multi-layered volumetric three-dimensional image.

In an embodiment, the object development system identifies and eliminates a partial portion or a whole portion of one or more of the three-dimensional (3D) printable units from the constructed multi-layered volumetric 3D image for optimizing the development of the 3D object. The object development system eliminates unnecessary volumes of the 3D printable units without compromising the physical and structural stability of the 3D printable units. In an embodiment, the object development system analyzes the 3D printable units of the 3D object based on elimination criteria comprising, for example, identification of non-visible 3D printable units from an outside view, identification of 3D printable units that can be eliminated without affecting structural stability of the 3D object, etc. For example, the 3D printable units 406a exemplarily illustrated in FIG. 4, are not visible from an outside view and removal of the 3D printable units 406a will not affect the structural stability of the 3D object. The object development system therefore eliminates these 3D printable units 406a in the printing process of the 3D object. By eliminating a partial portion or a whole portion of one or more of the 3D printable units, the object development system avoids undesirable and unnecessary volumes inside the 3D object without compromising physical aspects, structural aspects, stability, etc., of the 3D object. The object development system removes the undesirable 3D printable units for reducing printing material required for building or developing the 3D object and for reducing the weight of the 3D object. The object development system maintains the structural integrity of the 3D object. The assembly of the 3D object on the support frame avoids any structural instability that can be caused by the absence of the eliminated 3D printable units from the developed 3D object.

In an embodiment, the object development system configures structural spaces between the three-dimensional (3D) printable units for precluding deformities in the 3D object. The object development system considers gaps between the 3D printable units while segmenting the multi-layered volumetric 3D image into the 3D printable units. These gaps need to be considered due to multiple factors, for example, surface roughness, texture between the assembled 3D printed units, etc., so that the final 3D object is not deformed during and after assembly.

The object development system transmits 107 the three-dimensional (3D) printable units to one or more 3D printing devices for printing each of the 3D printable units for assembling and developing the 3D object. In an embodiment, the object development system is physically connected to the 3D printing devices to transmit the 3D printable units to the 3D printing devices. In another embodiment, the object development system is connected to the 3D printing devices via a network, for example, a wireless network, to transmit the 3D printable units to the 3D printing devices. In an embodiment, the support structure for the 3D object is manufactured separate from printing of the 3D printable units. Materials required for 3D printing the support structure typically require strong physical properties that are absent in many conventional 3D printing materials. The support structure is, for example, machined, cast, or milled with strong materials such as stainless steel using precision 3D development technologies. The support structure and the 3D printable units are digitally produced separately and gathered together to be assembled together to build a 3D object. In an example, the support structure is first machined, cast, or milled, and then the 3D printable units are 3D printed using a 3D printing device. The 3D printed units are assembled on the manufactured support structure to develop and build the 3D object.

In an embodiment, the object development system transmits the three-dimensional (3D) printable units to one or more 3D printing devices based on a configurable printing sequence for printing each of the 3D printable units for assembling and developing the 3D object. In an embodiment, the object development system determines the configurable printing sequence, and labels each 3D printable unit with a sequence number so that, after printing, the 3D printed units can be assembled in a correct order based on the configurable printing sequence. Consider an example where a user wishes to 3D print a toy dog using a 3D printing device. The user registers with the object development system via a graphical user interface (GUI) provided by the object development system. The object development system receives a 3D image of the toy dog from the user's laptop, constructs a multi-layered volumetric 3D image from the received 3D image, and segments the constructed multi-layered volumetric 3D image into multiple 3D printable units. The object development system then configures a printing sequence for printing of the 3D printable units by a 3D printing device. The object development system labels each 3D printable unit based on an order of arrangement of the 3D printable units to form a 3D printed toy dog. The object development system assigns labels 1, 2, 3, 4, 5, 6, etc., for the toy dog's face, ears, neck, hands, legs, tail, etc., respectively. In this example, the object development system configures the printing sequence in an ascending order of the assigned labels. In another embodiment, the object development system receives inputs from a user device for determining the configurable printing sequence.

A user can physically engage and assemble the three-dimensional (3D) printed units with each other to build the 3D object. In an embodiment, the object development system displays each 3D printable unit to a user before and/or after assembly, via the graphical user interface (GUI) provided by the object development system. In this embodiment, the object development system receives inputs from a user device, for example, if the user wishes to change the position of each of the 3D printable units, modify a shape or size of each 3D printable unit, etc.

In an embodiment, the object development system categorizes and groups each of the three-dimensional (3D) printable units into one or more portable print files for managing the printing of each 3D printable unit based on the configurable printing sequence. The object development system arranges the portable print files of the grouped 3D printable units in the configurable printing sequence and transmits the portable print files over the network to different types of 3D printing devices for printing. The transmitted portable print files can be printed at different time sequences as required by the user. In an embodiment, colored printing material can be used to create colored 3D objects.

In an embodiment, the object development system labels each three-dimensional (3D) printable unit using a labeling mechanism or a labeling system for identifying a position of each 3D printable unit and tracking positioning of each 3D printed unit during assembly of each 3D printed unit on a printed support structure to develop the 3D object. For example, as exemplarily illustrated in FIG. 7A, branching of branches 703 of a fractal tree 702 occurs 6 times; hence, the object development system assigns a six digit label to label the six branches 703. Thus, by tracking the assigned labels, a user can determine the branch 703 which the 3D printed unit belongs to or is associated with. In an embodiment, the object development system creates and renders a step by step video on the graphical user interface (GUI) of the object development system to instruct a user about a step by step assembly process. Since segmentation can generate many 3D printable units, the object development system labels each 3D printable unit, for example, with an indentation on each 3D printable unit. In an embodiment, the labeling mechanism is based on a geometrical and numerical system that allows a user to identify the proper location of each 3D printable unit and keep track of the 3D printable unit. For example, a number can be used to indicate a layer of a 3D printable unit or a location of the 3D printable unit.

After the three-dimensional (3D) printed units are assembled to build the 3D object, a final finish can be performed over a surface of the assembled 3D object, for example, to seal gaps in the assembled 3D object, strengthen the assembled 3D object, improve an overall appearance of the assembled 3D object, etc. After the 3D printed units are assembled, layers of bonding material, for example, polishing powder, paint, cement, etc., can be used to secure and bond the 3D printed units to each other. In an embodiment, the bonding material can be solidified by focusing curing lights on the 3D printed units after the 3D printed units are bonded to each other. A user may wish to reconfigure the assembled 3D object for improving structural attributes of the 3D object, for example, by applying a protective reinforcing outer layer over the exterior surface of the assembled 3D object. As used herein, "structural attributes" refer to features of a developed 3D object that need to be corrected in order to build a structurally strong and an esthetic 3D object. The structural attributes comprise, for example, strength, stability, appearance, etc., of the 3D object. In an embodiment, the object development system receives an image of the 3D object after the 3D object is assembled. In this embodiment, the object development system generates a reconfiguration image of the 3D object based on the received image of the assembled and developed 3D object. The reconfiguration image indicates areas of the assembled and developed 3D object that can be optimized, that is, adjusted or enhanced for improving structural attributes, overcoming development limitations, and increasing strength and longevity of the assembled and developed 3D object. In an example, the reconfiguration image indicates that the exterior surface of the assembled and developed 3D object can be protected by applying a protective reinforcing outer layer over the exterior surface of the assembled and developed 3D object for increasing strength and longevity of the assembled and developed 3D object. After the 3D object is assembled and developed, a reinforcing outer layer as displayed in the reconfiguration image on the graphical user interface (GUI) of the object development system, can be applied on an exterior surface of the assembled and developed 3D object, for example, to overcome physical and chemical limitations of a printing material used to 3D print the 3D object, thereby increasing strength and longevity of the assembled and developed 3D object.

Each step of the computer implemented method disclosed herein requires knowledge, skill, training, software, and equipment due to which the computer implemented method for three-dimensional (3D) object development may not be completed by one user or at one location. Multiple users at different locations using different types of 3D printing devices in communication with the object development system can work together as a team, for example, to design, mill, print, and send one or more components of a 3D object to a final assembly location. The users using user devices at different locations can communicate with each other and the object development system via a network.

Figure 2:
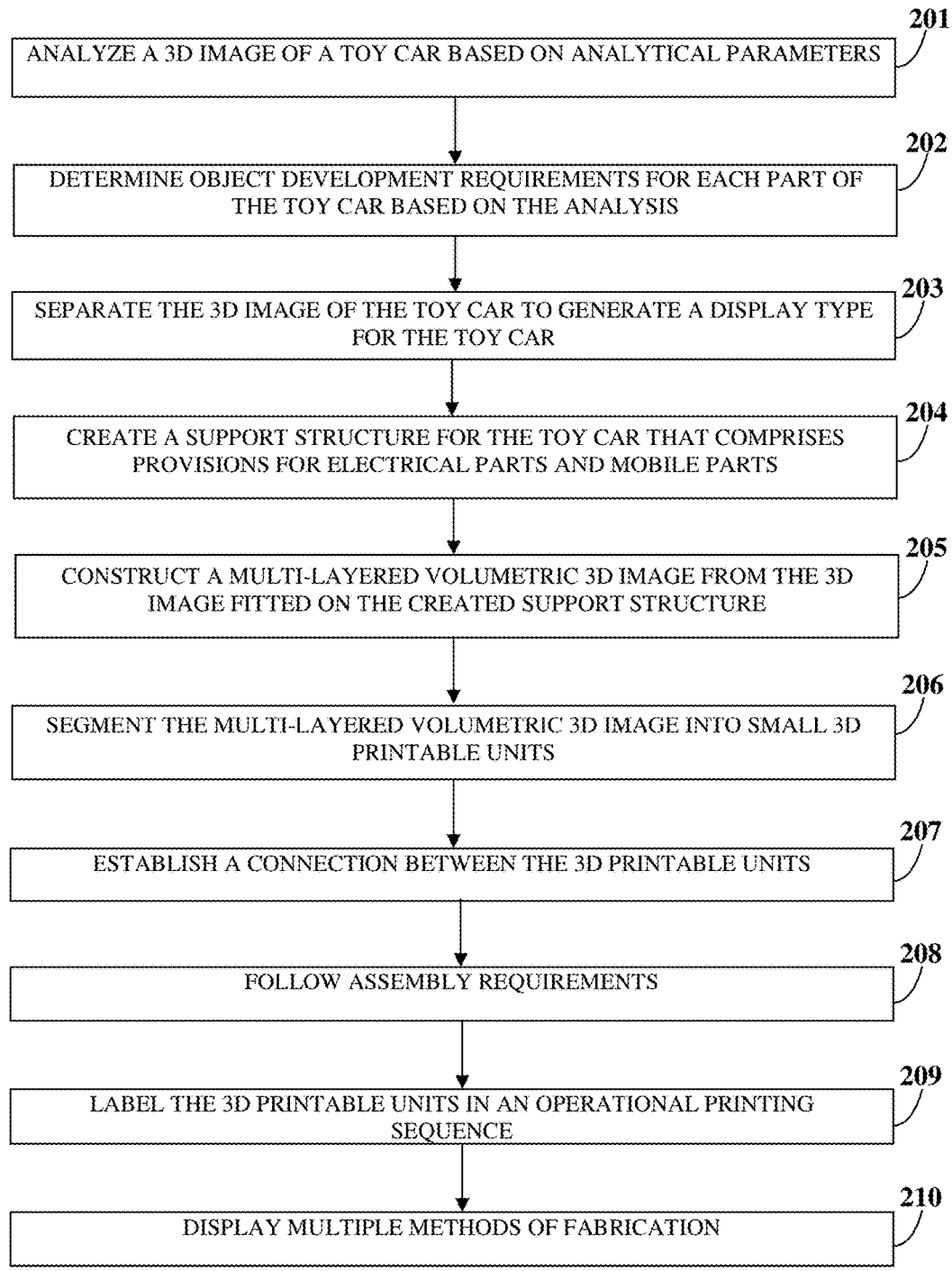
FIG. 2 exemplarily illustrates a flow diagram comprising the steps for developing a three-dimensional object.

FIG. 2 exemplarily illustrates a flow diagram comprising the steps for developing a three-dimensional (3D) object. Consider an example where a user wishes to 3D print a toy car. The user installs the object development system on a computing device, for example, a laptop with internet connectivity. The user creates a 3D image of the toy car using a design software such as 3DS MAX® of Autodesk, Inc., and inputs the 3D image of the toy car in a stereolithography (STL) file format to the object development system via a graphical user interface (GUI) of the object development system. The object development system receives the 3D image of the toy car in the STL file format. The object development system analyzes 201 the received 3D image of the toy car based on different analytical parameters, for example, function, structure, esthetics, geometrics, size, physical strength, mobility requirements, etc., of the toy car.

The object development system determines 202 object development requirements for each part of the toy car based on the analysis. The object development system displays the determined object development requirements comprising artistic requirements such as color, texture, etc., structural requirements such as a material type requirement, weight and size requirements, etc., and functional requirements such as a mechanical parts requirement, for each part of the toy car on the GUI. The object development system separates 203 the received three-dimensional (3D) image of the toy car to generate a display type for the toy car, and then creates 204 a support structure for the toy car that comprises provisions for electrical parts and mobile parts. The object development system displays the display type to the user via the GUI. In an embodiment, the object development system receives inputs from the user via the GUI for incorporating any changes in the development of the toy car. For example, the user may input changes based on the displayed object development requirements such as a change in the color of the toy car, a change in the size of the toy car, etc.

The object development system creates the support structure for the toy car based on the object development requirements and the display type. The support structure created by the object development system is an internal structural frame that resembles the shape of the toy car. In an embodiment, the object development system configures the support structure for the toy car to incorporate mobile parts such as wheels, and electrical parts such as motors for the wheels and a power source to run the toy car. The object development system fits the received three-dimensional (3D) image on the created support structure and constructs 205 a multi-layered volumetric 3D image from the 3D image fitted on the created support structure. The object development system segments 206 the constructed multi-layered volumetric 3D image into multiple small 3D printable units. The small 3D printable units can be printed using a printing method and a printing device selected by the user. The object development system performs the segmentation by geometrical division algorithms or by functional division algorithms or structural division algorithms.

The object development system establishes 207 a connection between the three-dimensional (3D) printable units and follows 208 assembly requirements to determine a printing sequence. The object development system labels 209 the 3D printable units in an operational printing sequence with a number based on a position of each of the 3D printable units on the support frame to build the toy car. The object development system displays 210 multiple methods of fabrication comprising, for example, 3D printing or manufacturing methods and devices, milling, casting, incorporation of pre-made parts, etc., on the GUI. The user selects an option of 3D printing using a MakerBot® printer via the GUI. The object development system transmits the 3D printable units to the MakerBot® printer based on the operational printing sequence such that each 3D printable unit is printed by the MakerBot® printer in a specific order determined by the label of the 3D printable unit. The object development system configures connection grooves such as dents in each 3D printable unit to facilitate insertion of screws in the dents while assembling the 3D printed units to build the toy car.

Once the MakerBot® printer prints each of the three-dimensional (3D) printable units, the user can assemble and connect the 3D printed units together using screws that can be inserted into the configured dents in the 3D printed units. After building the toy car by assembling the 3D printed units based on the label printed on each 3D printed unit, the user captures an image of the built toy car using a mobile phone. The mobile phone transmits the captured image to the object development system via a network, for example, the internet. The object development system receives the image of the built toy car from the user's mobile phone via the network. The object development system generates a reconfiguration image for the built toy car based on the received image and transmits the reconfiguration image to the user's mobile phone via the network. The reconfiguration image indicates areas of optimization in the built toy car for improving structural attributes, overcoming development limitations, and increasing strength and longevity of the built toy car. For example, the reconfiguration image indicates application of a protective reinforcing outer layer on an exterior surface of the built toy car to overcome physical and chemical limitations of a printing material used in 3D printing the toy car, thereby increasing strength and longevity of the built toy car. The reconfiguration image further comprises indications to changes that need to be made in the built toy car. The changes comprise, for example, gaps between one or more of the 3D printed units that need to be sealed, additional coloring that needs to be added to one or more of the 3D printed units to enhance the appearance of the built toy car, etc. The user can therefore develop the toy car by 3D printing each 3D printable unit generated by the object development system and assembling the 3D printed units together based on the labeling scheme determined by the object development system.

Figure 3:
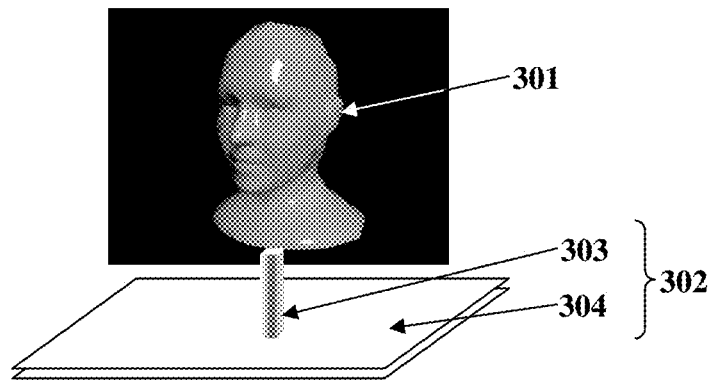
FIG. 3 exemplarily illustrates a three-dimensional image of a three-dimensional face mask supported on a support structure.

FIG. 3 exemplarily illustrates a three-dimensional (3D) image 301 of a 3D face mask supported on a support structure 302. The support structure 302 comprises, for example, a baseboard structure 304 and a metal stand 303. The object development system receives a 3D image 301 from one of multiple sources in one of multiple image formats as disclosed in the detailed description of FIG. 1. The object development system analyzes the received 3D image 301 based on multiple analytical parameters and determines object development requirements comprising, for example, structural requirements such as amount of printing material to be used by a 3D printing device to maintain structural integrity of the 3D face mask, artistic requirements such as color of the printing material, a shape of each element of the 3D face mask, etc. The object development system also determines a display type of the received 3D image 301. Based on the analysis of the received 3D image 301, the object development system determines that the display type of the received 3D image 301 is, for example, a 3D mask depicting a face of a person. The object development system creates the support structure 302 comprising the baseboard structure 304 along with the metal stand 303 based on the determined object development requirements and the display type. The object development system fits the received 3D image 301 on the created support structure 302 as exemplarily illustrated in FIG. 3, prior to construction of a multi-layered volumetric 3D image, and segmentation of the constructed multi-layered volumetric 3D image into 3D printable units that are printed using one or more 3D printing devices. The support structure 302 is configured to provide additional support to the 3D face mask after assembling the 3D printed units on a printed support structure.

FIG. 4 exemplarily illustrates a multi-layered volumetric three-dimensional (3D) image 404. The object development system receives a 3D image 301 of a face for which a 3D object such as a 3D face mask needs to be created and 3D printed. The object development system receives the 3D image 301 from a design software source such as 3DS MAX®. Depending on object development requirements and a display type of the received 3D image 301, the object development system creates a support structure 401 comprising, for example, a support base 402 and an inner structural frame 403 for the 3D object. The inner structural frame 403 provides inner structural strength to the 3D object after the 3D object is printed using a 3D printing device and assembled on a printed support structure. The object development system fits the received 3D image 301 on the support structure 401 and constructs a multi-layered volumetric 3D image 404 comprising multiple shell layers 405, for example, 2 layers to 3 layers of 3D printable units 406a and 406b to maintain structural strength of the 3D object.

Figure 5A:
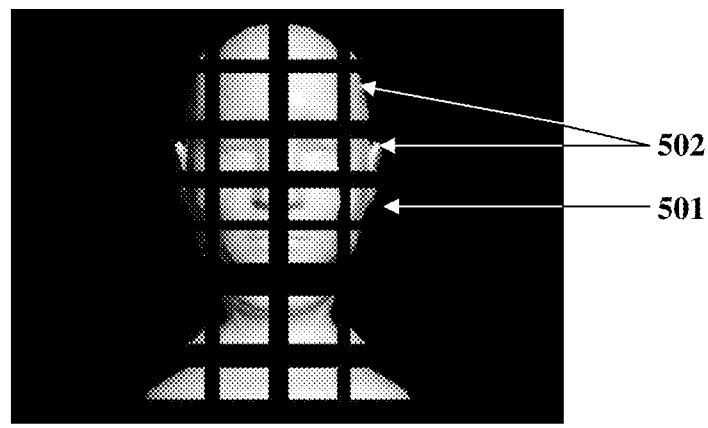
FIG. 5A exemplarily illustrates a front elevation view of the multi-layered volumetric three-dimensional image segmented into multiple three-dimensional printable units.
Figure 5B:
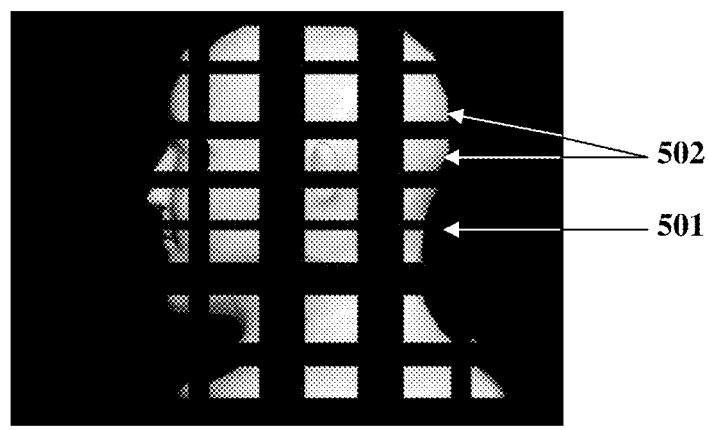
FIG. 5B exemplarily illustrates a right side perspective view of the multi-layered volumetric three-dimensional image segmented into multiple three-dimensional printable units.
Figure 5C:
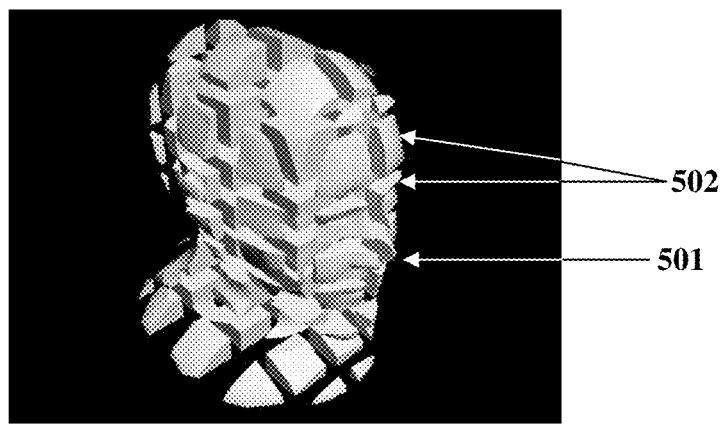
FIG. 5C exemplarily illustrates an angled top perspective view of the multi-layered volumetric three-dimensional image segmented into multiple three-dimensional printable units.

FIGS. 5A-5C exemplarily illustrate different views of the multi-layered volumetric three-dimensional (3D) image 501 created from a 3D image 301 exemplarily illustrated in FIGS. 3-4, showing multiple 3D printable units 502. In an embodiment, the object development system constructs the multi-layered volumetric 3D image 501 from the 3D image 301 fitted on the support structure 302 comprising the metal stand 303 and the baseboard structure 304 exemplarily illustrated in FIG. 3. In another embodiment, the object development system constructs the multi-layered volumetric 3D image 501 from the 3D image 301 fitted on the support structure 401 comprising the support base 402 and the inner structural frame 403 exemplarily illustrated in FIG. 4. The object development system segments the constructed multi-layered volumetric 3D image 501 into the 3D printable units 502 exemplarily illustrated in FIGS. 5A-5C. FIG. 5A exemplarily illustrates a front elevation view of the multi-layered volumetric 3D image 501 segmented into multiple 3D printable units 502. FIG. 5B exemplarily illustrates a right side perspective view of the multi-layered volumetric 3D image 501 segmented into multiple 3D printable units 502. FIG. 5C exemplarily illustrates an angled top perspective view of the multi-layered volumetric 3D image 501 segmented into multiple 3D printable units 502.

Figure 6A:
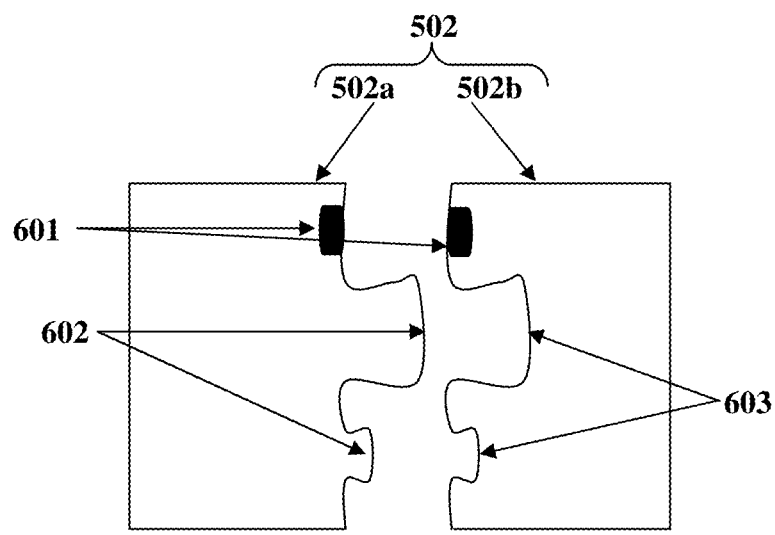
FIGS. 6A-6B exemplarily illustrate configuration of connecting elements by an object development system for assembling three-dimensional printable units to develop a three-dimensional object.
Figure 6B:
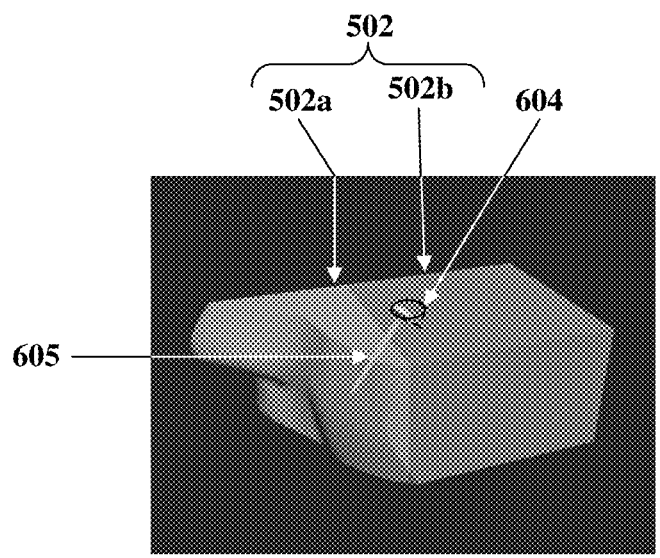

FIGS. 6A-6B exemplarily illustrate configuration of connecting elements by an object development system for assembling three-dimensional (3D) printable units 502 to develop a 3D object. The object development system configures one or more connecting elements, for example, a magnet 601, a bar 602, a dent 603, a screw 605, etc., for securing the 3D printable units 502a and 502b to each other and/or to the support structure, for example, 302 exemplarily illustrated in FIG. 3, or 401 exemplarily illustrated in FIG. 4, depending on geometric restrictions of the 3D object. For example, magnets 601 can be positioned on two adjacent 3D printable units 502a and 502b to secure the adjacent 3D printable units 502a and 502b to each other, or bars 602 can be configured on one 3D printable unit 502a that engage with dents 603 configured on the adjacent 3D printable unit 502b to secure the 3D printable units 502a and 502b to each other as exemplarily illustrated in FIG. 6A.

As exemplarily illustrated in FIG. 6B, the object development system configures a connection groove 604 in a three-dimensional (3D) printable unit 502b for facilitating insertion of a connecting element, for example, a screw 605 into the connection groove 604 to secure the 3D printable units 502a and 502b to each other to develop the 3D object as disclosed in the detailed description of FIG. 1. In an embodiment, screws 605 are inserted into the configured connection grooves 604 on one or more sides of the 3D printable units 502a and 502b to secure the 3D printable units 502a and 502b to each other. In an embodiment, the screws 605 are inserted into the configured connection grooves 604 on one or more sides of the 3D printable units 502a and 502b to secure the 3D printable units 502a and 502b to the support structure 302 comprising, for example, the baseboard structure 304 and the metal stand 303 exemplarily illustrated in FIG. 3, or to the support structure 401 comprising, for example, the support base 402 and the inner structural frame 403 exemplarily illustrated in FIG. 4. In an embodiment, during assembly of the 3D printed units on the printed support structure, 3D fitting plugs (not shown) can be used to fill voids created by the inserted screws 605. The object development system pre-configures the connection grooves 604 in the 3D printable units 502a and 502b, where the screws 605 can be inserted, so that during development of the 3D object, placement of physical screws does not deform an outer shape of the 3D object.

Figure 7A:
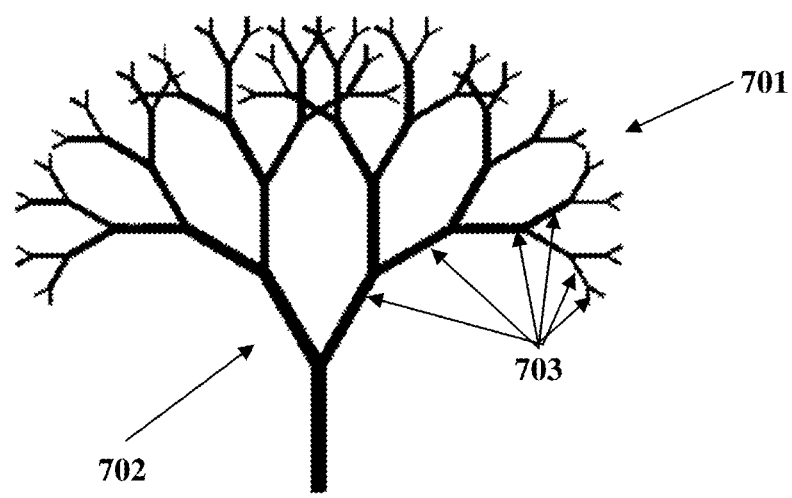
FIGS. 7A-7C exemplarily illustrate development of a three-dimensional fractal tree from a three-dimensional image of a fractal tree using self-similar three-dimensional printable units.
Figure 7B:
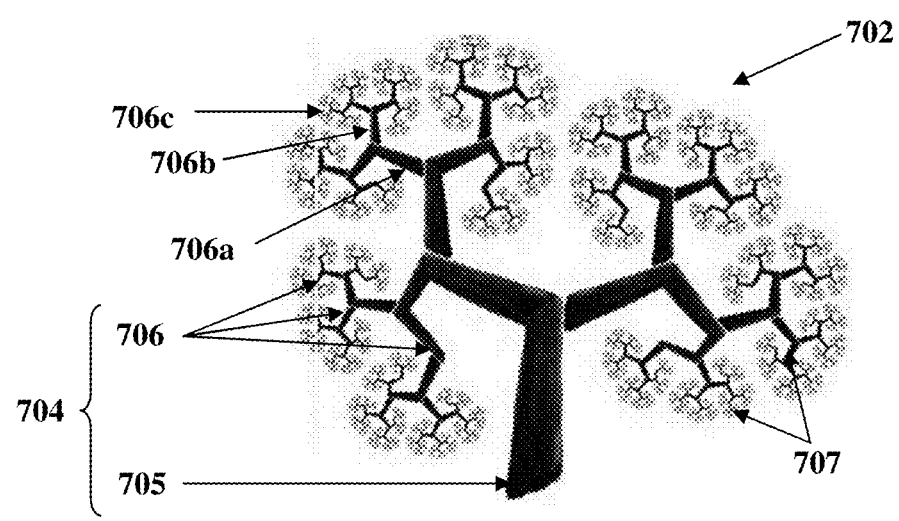
Figure 7C:
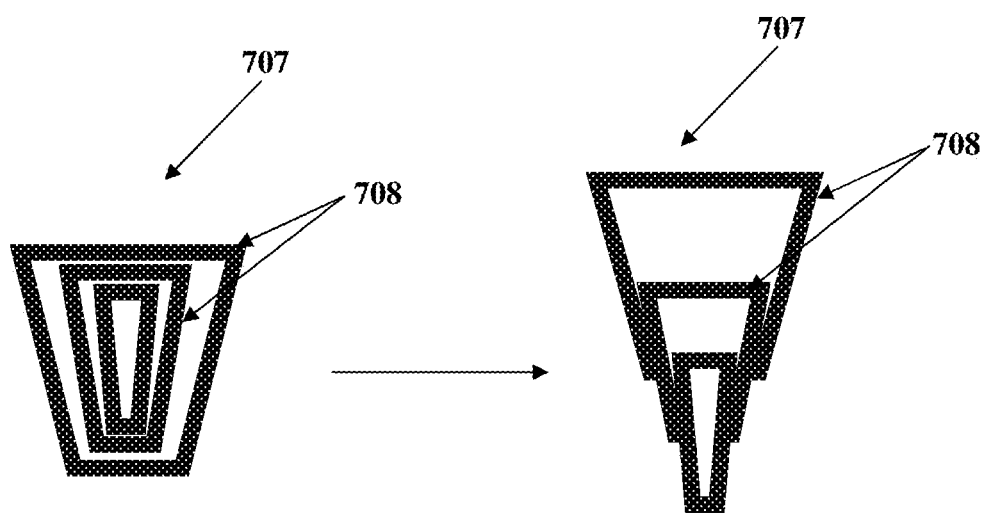

FIGS. 7A-7C exemplarily illustrate development of a three-dimensional (3D) fractal tree (not shown) from a 3D image 701 of a fractal tree 702 using self-similar 3D printable units 707, for example, self-similar trapezoidal elements 708 exemplarily illustrated in FIG. 7C. FIG. 7A exemplarily illustrates the 3D image 701 of the fractal tree 702 in an image format such as a stereolithography (STL) file format, received from a 3D scanning software such as NextEngine® by the object development system. The object development system receives the 3D image 701 of the fractal tree 702 comprising multiple branches 703 exemplarily illustrated in FIG. 7A.

The object development system analyzes the received three-dimensional (3D) image 701 of the fractal tree 702 and determines a display type for the received 3D image 701. As exemplarily illustrated in FIG. 7B, the display type is a fractal structure that resembles the fractal tree 702 shown in the received 3D image 701 exemplarily illustrated in FIG. 7A. The object development system creates a support structure 704 for developing the 3D fractal tree. In an embodiment, the created support structure 704 comprises a support element configured as a trunk element 705 and multiple branching elements 706 as exemplarily illustrated in FIG. 7B. The object development system fits the received 3D image 701 on the created support structure 704 and constructs a multi-layered volumetric 3D image branching out similar to the 3D image 701 fitted on the created support structure 704.

The object development system segments the constructed multi-layered volumetric three-dimensional (3D) image into multiple 3D printable units 707 as exemplarily illustrated in FIG. 7B. In an embodiment, the object development system configures the 3D printable units 707 as self-similar basic features or units to create complex structures such as the fractal tree 702 exemplarily illustrated in FIG. 7A. In an embodiment, the branches 703 of the fractal tree 702 are created using self-similar trapezoidal elements 708 exemplarily illustrated in FIG. 7C. The object development system creates the trunk element 705 and the branching elements 706 exemplarily illustrated in FIG. 7B, that resemble the branches 703 of the fractal tree 702 exemplarily illustrated in FIG. 7A, using the self-similar trapezoidal elements 708 exemplarily illustrated in FIG. 7C. In the fractal tree 702 exemplarily illustrated in FIG. 7B, each long branching element 706a can be connected to a short branching element 706b in a self-similar manner. The branching of the branching elements 706a and 706b continues until the end branching element 706c as exemplarily illustrated in FIG. 7B. In an embodiment, the object development system creates the 3D printable units 707 in the shape of the self-similar trapezoidal elements 708 exemplarily illustrated in FIG. 7C, that can be attached to create long branching elements 706a and/or short branching elements 706b as exemplarily illustrated in FIG. 7B. In an embodiment, the object development system configures the branching elements 706 and the trunk element 705 to be connected to each other to form the fractal tree 702 using a connecting element such as a screw 605 exemplarily illustrated in FIG. 6B.

The object development system transmits each three-dimensional (3D) printable unit 707 comprising the self-similar trapezoidal elements 708 to a 3D printing device for printing each 3D printable unit 707 for assembling and developing the 3D fractal tree. The printed branches are attached to each other to form the entire 3D fractal tree. In the 3D fractal tree that is printed using the 3D printing device, each printed long branch can be connected to a short branch in a self-similar manner.

Figure 8:
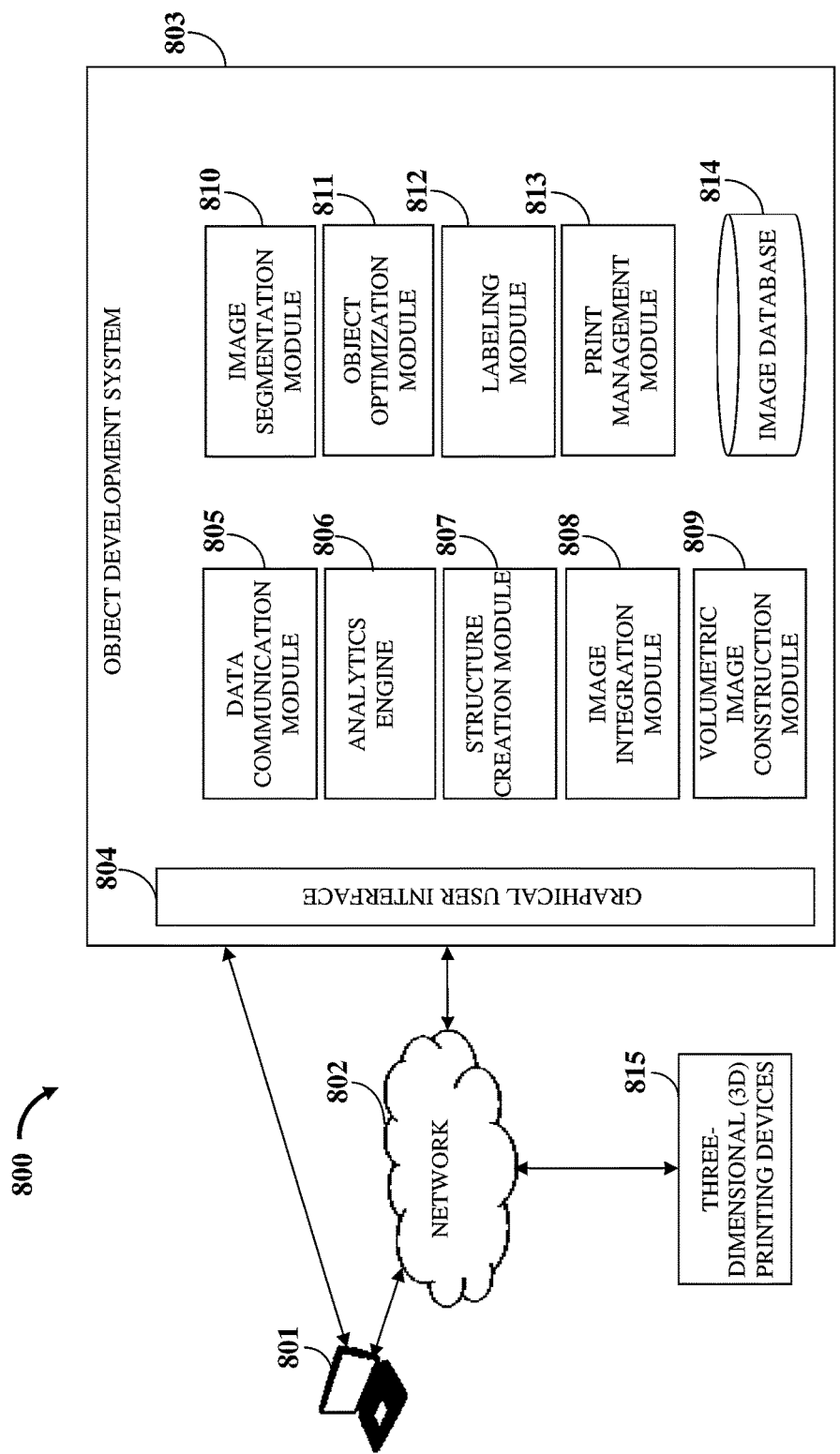
FIG. 8 exemplarily illustrates a computer implemented system for developing a three-dimensional object.

FIG. 8 exemplarily illustrates a computer implemented system 800 for developing a three-dimensional (3D) object. The computer implemented system 800 disclosed herein comprises the object development system 803 in communication with 3D printing devices 815 directly or via a network 802. The object development system 803 comprises an object development software application that is configured as commercialized software that can be downloaded on a user device 801. In an embodiment, the object development system 803 is configured to operate as a software as a service (SaaS). In another embodiment, the object development system 803 is configured to operate, for example, as a platform as a service (PaaS) implemented in a cloud computing environment. As used herein, "cloud computing environment" refers to a processing environment comprising configurable computing physical and logical resources, for example, networks, servers, storage, applications, services, etc., and data distributed over a network 802, for example, the internet. The cloud computing environment provides on-demand network access to a shared pool of the configurable computing physical and logical resources. In an embodiment, the object development system 803 is a cloud computing based platform implemented as a service for developing a 3D object. The object development system 803 is developed, for example, using the Google App engine cloud infrastructure of Google Inc., Amazon Web Services® of Amazon Technologies, Inc., the Amazon EC2® web service of Amazon Technologies, Inc., the Google® Cloud platform of Google Inc., the Microsoft® Cloud platform of Microsoft Corporation, etc.

In an embodiment, the object development system 803 is installed on the user device 801. In another embodiment, the object development system 803 is accessible by the user device 801 via the network 802. The user device 801 is an electronic device, for example, a personal computer, a tablet computing device, a mobile computer, a mobile phone, a smart phone, a portable computing device, a laptop, a personal digital assistant, a touch centric device, a workstation, a client device, a portable electronic device, a network enabled computing device, an interactive network enabled communication device, any other suitable computing equipment, and combinations of multiple pieces of computing equipment. Computing equipment may be used to implement applications such as a web browser, an electronic mail (email) application, etc. Computing equipment, for example, one or more servers may be associated with one or more online services. The network 802 through which the user device 801 and the 3D printing devices 815 communicate with the object development system 803 is, for example, the internet, an intranet, a wired network, a wireless network, a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a long-term evolution (LTE) mobile communication network, a public telephone network, etc., a local area network, a wide area network, an internet connection network, an infrared communication network, etc., or a network formed from any combination of these networks. The object development system 803 is accessible to users, for example, through a broad spectrum of technologies and devices such as personal computers with access to the internet, internet enabled cellular phones, tablet computing devices, etc.

The object development system 803 disclosed herein comprises a non-transitory computer readable storage medium such as a memory unit, and at least one processor communicatively coupled to the non-transitory computer readable storage medium. As used herein, "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor, except for a transitory, propagating signal. The non-transitory computer readable storage medium stores computer program instructions defined by modules, for example, 805, 806, 807, 808, 809, 810, 811, 812, 813, etc., of the object development system 803. The processor is configured to execute the defined computer program instructions.

The object development system 803 further comprises a graphical user interface (GUI) 804, a data communication module 805, an analytics engine 806, a structure creation module 807, an image integration module 808, a volumetric image construction module 809, an image segmentation module 810, a print management module 813, and an image database 814. A user inputs a three-dimensional (3D) image, for example, 301 exemplarily illustrated in FIG. 3, into the object development system 803 via the GUI 804. The GUI 804 is, for example, a webpage of a website hosted by the object development system 803, an online web interface, a web based downloadable application interface, a mobile based downloadable application interface, etc. The data communication module 805 receives the three-dimensional (3D) image, for example, 301 in one or more of multiple image formats from one or more of multiple sources via the GUI 804. The data communication module 805 stores the received 3D image, for example, 301 in the image database 814.

The analytics engine 806 determines object development requirements and a display type of the received three-dimensional (3D) image, for example, 301 by analyzing the received 3D image, for example, 301 based on multiple analytical parameters. The structure creation module 807 creates a support structure, for example, 302, 401, etc., exemplarily illustrated in FIGS. 3-4, for the 3D object based on the determined object development requirements and the display type of the received 3D image, for example, 301. In an embodiment, the structure creation module 807 configures the support structure, for example, 302, 401, etc., to incorporate one or more control mechanisms and electronic components in the created support structure, for example, 302, 401, etc.

The image integration module 808 fits the received three-dimensional (3D) image, for example, 301 on the created support structure, for example, 302, 401, etc. The volumetric image construction module 809 constructs a multi-layered volumetric 3D image, for example, 404, 501, etc., exemplarily illustrated in FIG. 4 and FIGS. 5A-5C, from the received 3D image, for example, 301, fitted on the created support structure, for example, 302, 401, etc. The volumetric image construction module 809 stores the multi-layered volumetric 3D image, for example, 404, 501, etc., in the image database 814. The image segmentation module 810 segments the constructed multi-layered volumetric 3D image, for example, 404, 501, etc., into multiple 3D printable units, for example, 406a, 406b, 502, etc., exemplarily illustrated in FIG. 4 and FIGS. 5A-5C. The object development system 803 further comprises an object optimization module 811 for configuring one or more connection grooves 604 exemplarily illustrated in FIG. 6B, into each 3D printable unit, for example, 502b for facilitating insertion of one or more connecting elements for assembling and securing the 3D printed units. In an embodiment, the object optimization module 811 configures structural spaces between the 3D printable units, for example, 406a, 406b, 502, etc., for precluding deformities in the 3D object during and after assembling the 3D printed units for developing the 3D object. In an embodiment, the object optimization module 811 identifies and eliminates a partial portion or a whole portion of one or more of the 3D printable units, for example, 406a, 406b, 502, etc., from the constructed multi-layered volumetric 3D image, for example, 404, 501, etc., for optimizing the development of the 3D object.

The print management module 813 transmits the three-dimensional (3D) printable units, for example, 406a, 406b, 502, etc., to one or more 3D printing devices 815 for printing each 3D printable unit, for example, 406a, 406b, 502, etc., for assembling and developing the 3D object. The object development system 803 further comprises a labeling module 812 for labeling each 3D printable unit, for example, 406a, 406b, 502, etc., using a labeling mechanism for identifying a position of each 3D printable unit, for example, 406a, 406b, 502, etc., and tracking positioning of each 3D printed unit during assembly of each 3D printed unit. The print management module 813 transmits the 3D printable units, for example, 406a, 406b, 502, etc., to one or more 3D printing devices 815 based on a configurable printing sequence for printing each of the 3D printable units, for example, 406a, 406b, 502, etc., for assembling and developing the 3D object. In an embodiment, the print management module 813 categorizes and groups each 3D printable unit, for example, 406a, 406b, 502, etc., into one or more print files for managing the printing of each 3D printable unit, for example, 406a, 406b, 502, etc., based on the configurable printing sequence.

In an embodiment, the data communication module 805 receives an image of the assembled and developed three-dimensional (3D) object and stores the image in the image database 814. In an embodiment, the object optimization module 811 generates a reconfiguration image of the 3D object based on the image of the assembled and developed 3D object received by the data communication module 805 to indicate areas of optimization in the assembled and developed 3D object. The object optimization module 811 stores the reconfiguration image in the image database 814.

Figure 9:
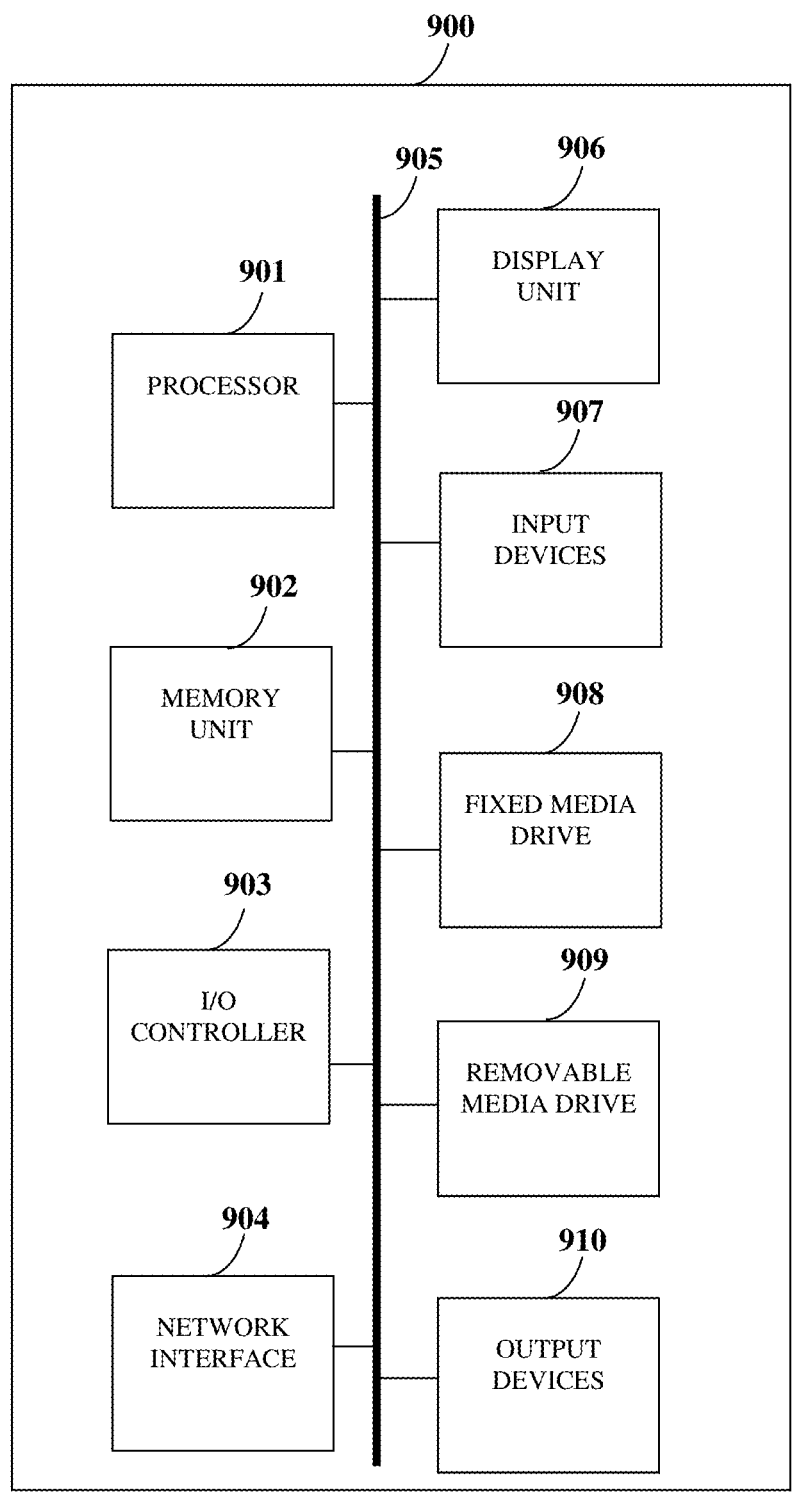
FIG. 9 exemplarily illustrates the architecture of a computer system employed by the object development system for developing a three-dimensional object.

FIG. 9 exemplarily illustrates the architecture of a computer system 900 employed by the object development system 803 exemplarily illustrated in FIG. 8, for developing a three-dimensional (3D) object. The object development system 803 of the computer implemented system 800 exemplarily illustrated in FIG. 8, employs the architecture of the computer system 900 exemplarily illustrated in FIG. 9. The computer system 900 is programmable using a high level computer programming language. The computer system 900 may be implemented using programmed and purposeful hardware. The object development system 803 communicates with a user device 801, exemplarily illustrated in FIG. 8, of each user, for example, a customer, a 3D printing service provider, etc., registered with the object development system 803 via a network 802 exemplarily illustrated in FIG. 8, for example, a short range network or a long range network.

The computer system 900 comprises, for example, a processor 901, a non-transitory computer readable storage medium such as a memory unit 902 for storing programs and data, an input/output (I/O) controller 903, a network interface 904, a data bus 905, a display unit 906, input devices 907, a fixed media drive 908 such as a hard drive, a removable media drive 909 for receiving removable media, output devices 910, etc. The processor 901 refers to any one or more microprocessors, central processing unit (CPU) devices, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. The processor 901 may also be implemented as a processor set comprising, for example, a general purpose microprocessor and a math or graphics co-processor. The processor 901 is selected, for example, from the Intel® processors such as the Itanium® microprocessor or the Pentium® processors, Advanced Micro Devices (AMD®) processors such as the Athlon® processor, UltraSPARC® processors, microSPARC® processors, HP® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The object development system 803 disclosed herein is not limited to a computer system 900 employing a processor 901. The computer system 900 may also employ a controller or a microcontroller. The processor 901 executes the modules, for example, 805, 806, 807, 808, 809, 810, 811, 812, 813, etc., of the object development system 803.

The memory unit 902 is used for storing programs, applications, and data. For example, the data communication module 805, the analytics engine 806, the structure creation module 807, the image integration module 808, the volumetric image construction module 809, the image segmentation module 810, the object optimization module 811, the labeling module 812, the print management module 813, etc., of the object development system 803 are stored in the memory unit 902 of the computer system 900. The memory unit 902 is, for example, a random access memory (RAM) or another type of dynamic storage device that stores information and instructions for execution by the processor 901. The memory unit 902 also stores temporary variables and other intermediate information used during execution of the instructions by the processor 901. The computer system 900 further comprises a read only memory (ROM) or another type of static storage device that stores static information and instructions for the processor 901. The I/O controller 903 controls input actions and output actions performed by the object development system 803.

The network interface 904 enables connection of the computer system 900 to the network 802. For example, the object development system 803 connects to the network 802 via the network interface 904. In an embodiment, the network interface 904 is provided as an interface card also referred to as a line card. The network interface 904 comprises, for example, one or more of an infrared (IR) interface, an interface implementing WiFi®, a universal serial bus (USB) interface, a FireWire® interface of Apple, Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, and Ethernet communication interfaces, asynchronous transfer mode (ATM) interfaces, a high speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The data bus 905 permits communications between the modules, for example, 804, 805, 806, 807, 808, 809, 810, 811, 812, 813, etc., of the object development system 803.

The display unit 906, via the graphical user interface (GUI) 804 exemplarily illustrated in FIG. 8, displays information, display interfaces, user interface elements such as text fields, checkboxes, text boxes, dropdown menus, indicators, windows, etc., for allowing a user, for example, a customer or a three-dimensional (3D) printing service provider to view multi-layered volumetric 3D images, for example, 404, 501, etc., exemplarily illustrated in FIG. 4 and FIGS. 5A-5C, 3D printable units, for example, 406a, 406b, 502, etc., exemplarily illustrated in FIG. 4 and FIGS. 5A-5C, for developing the 3D object. The display unit 906 comprises, for example, a liquid crystal display, a plasma display, an organic light emitting diode (OLED) based display, etc. The input devices 907 are used for inputting data into the computer system 900. A user, for example, a customer, a 3D printing service provider, etc., uses the input devices 907 to provide 3D images, for example, 301, 701, etc., exemplarily illustrated in FIG. 3 and FIG. 7A, of objects to the object development system 803. For example, a customer or a 3D printing service provider may upload 3D images, for example, 301, 701, etc., of an object that he or she wishes to 3D print, etc., using the input devices 907. The input devices 907 are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc.

Computer applications and programs are used for operating the computer system 900. The programs are loaded onto the fixed media drive 908 and into the memory unit 902 of the computer system 900 via the removable media drive 909. In an embodiment, the computer applications and programs may be loaded directly via the network 802. Computer applications and programs are executed by double clicking a related icon displayed on the display unit 906 using one of the input devices 907. The output devices 910 output the results of operations performed by the object development system 803. For example, the object development system 803 provides customized reports on the development of the three-dimensional (3D) object to a user using the output devices 910. The object development system 803 displays the generated reports using the output devices 910.

The processor 901 executes an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., Palm OS®, the Solaris® operating system developed by Sun Microsystems, Inc., the Android operating system, the Windows Phone® operating system of Microsoft Corporation, the BlackBerry® operating system of Blackberry Limited, the iOS operating system of Apple Inc., the Symbian operating system of Symbian Foundation Limited, etc. The computer system 900 employs the operating system for performing multiple tasks. The operating system is responsible for management and coordination of activities and sharing of resources of the computer system 900. The operating system further manages security of the computer system 900, peripheral devices connected to the computer system 900, and network connections. The operating system employed on the computer system 900 recognizes, for example, inputs provided by the user using one of the input devices 907, the output display, files, and directories stored locally on the fixed media drive 908. The operating system on the computer system 900 executes different programs using the processor 901. The processor 901 and the operating system together define a computer platform for which application programs in high level programming languages are written.

The processor 901 of the computer system 900 employed by the object development system 803 retrieves instructions defined by the data communication module 805, the analytics engine 806, the structure creation module 807, the image integration module 808, the volumetric image construction module 809, the image segmentation module 810, the object optimization module 811, the labeling module 812, the print management module 813, etc., of the object development system 803 for performing respective functions disclosed in the detailed description of FIG. 8. The processor 901 retrieves instructions for executing the modules, for example, 805, 806, 807, 808, 809, 810, 811, 812, 813, etc., of the object development system 803 from the memory unit 902. A program counter determines the location of the instructions in the memory unit 902. The program counter stores a number that identifies the current position in the program of each of the modules, for example, 805, 806, 807, 808, 809, 810, 811, 812, 813, etc., of the object development system 803. The instructions fetched by the processor 901 from the memory unit 902 after being processed are decoded. The instructions are stored in an instruction register in the processor 901. After processing and decoding, the processor 901 executes the instructions, thereby performing one or more processes defined by those instructions.

At the time of execution, the instructions stored in the instruction register are examined to determine the operations to be performed. The processor 901 then performs the specified operations. The operations comprise arithmetic operations and logic operations. The operating system performs multiple routines for performing a number of tasks required to assign the input devices 907, the output devices 910, and memory for execution of the modules, for example, 805, 806, 807, 808, 809, 810, 811, 812, 813, etc., of the object development system 803. The tasks performed by the operating system comprise, for example, assigning memory to the modules, for example, 805, 806, 807, 808, 809, 810, 811, 812, 813, etc., of the object development system 803, and to data used by the object development system 803, moving data between the memory unit 902 and disk units, and handling input/output operations. The operating system performs the tasks on request by the operations and after performing the tasks, the operating system transfers the execution control back to the processor 901. The processor 901 continues the execution to obtain one or more outputs. The outputs of the execution of the modules, for example, 805, 806, 807, 808, 809, 810, 811, 812, 813, etc., of the object development system 803 are displayed to the user on the display unit 906.

For purposes of illustration, the detailed description refers to the object development system 803 being run locally on the computer system 900; however the scope of the computer implemented method and system 800 disclosed herein is not limited to the object development system 803 being run locally on the computer system 900 via the operating system and the processor 901, but may be extended to run remotely over the network 802 by employing a web browser and a remote server, a mobile phone, or other electronic devices. One or more portions of the computer system 900 may be distributed across one or more computer systems (not shown) coupled to the network 802.

Disclosed herein is also a computer program product comprising a non-transitory computer readable storage medium that stores computer program codes comprising instructions executable by at least one processor 901 for developing a three-dimensional (3D) object. The computer program product comprises a first computer program code for receiving a 3D image, for example, 301 exemplarily illustrated in FIG. 3, in one or more of multiple image formats from one or more of multiple sources; a second computer program code for determining object development requirements and a display type of the received 3D image, for example, 301 by analyzing the received 3D image, for example, 301; a third computer program code for creating a support structure, for example, 302, 401, etc., exemplarily illustrated in FIGS. 3-4, for the 3D object based on the determined object development requirements and the display type of the received 3D image, for example, 301; a fourth computer program code for fitting the received 3D image, for example, 301, on the created support structure, for example, 302, 401, etc.; a fifth computer program code for constructing a multi-layered volumetric 3D image, for example, 404, 501, etc., from the received 3D image, for example, 301 fitted on the created support structure, for example, 302, 401, etc.; a sixth computer program code for segmenting the constructed multi-layered volumetric 3D image, for example, 404, 501, etc., into multiple 3D printable units, for example, 406a, 406b, 502, etc.; and a seventh computer program code for transmitting the 3D printable units, for example, 406a, 406b, 502, etc., to one or more 3D printing devices 815 exemplarily illustrated in FIG. 8, for printing each 3D printable unit, for example, 406a, 406b, 502, etc., for assembling and developing the 3D object.

The computer program product disclosed herein further comprises an eighth computer program code for configuring one or more branching elements movably attached to a support element in the created support structure, for example, 302, 401, etc., for facilitating movement in the three-dimensional (3D) object, and a ninth computer program code for configuring the support structure, for example, 302, 401, etc., to incorporate one or more control mechanisms and electronic components in the created support structure, for example, 302, 401, etc. The computer program product disclosed herein further comprises one or more additional computer program codes for performing additional steps that may be required and contemplated for developing the 3D object. In an embodiment, a single piece of computer program code comprising computer executable instructions performs one or more steps of the computer implemented method disclosed herein for developing the 3D object.

The computer program codes comprising computer executable instructions are embodied on the non-transitory computer readable storage medium. The processor 901 of the computer system 900 retrieves these computer executable instructions and executes them. When the computer executable instructions are executed by the processor 901, the computer executable instructions cause the processor 901 to perform the steps of the computer implemented method for developing the three-dimensional (3D) object.

It will be readily apparent that the various methods, algorithms, and computer programs disclosed herein may be implemented on computer readable media appropriately programmed for computing devices. As used herein, "computer readable media" refers to non-transitory computer readable media that participate in providing data, for example, instructions that may be read by a computer, a processor or a similar device. Non-transitory computer readable media comprise all computer readable media, for example, non-volatile media, volatile media, and transmission media, except for a transitory, propagating signal. Non-volatile media comprise, for example, optical discs or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a floppy disk, a flexible disk, a hard disk, magnetic tape, a laser disc, a Blu-ray Disc®, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

The computer programs that implement the methods and algorithms disclosed herein may be stored and transmitted using a variety of media, for example, the computer readable media in a number of manners. In an embodiment, hardwired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of programming languages that can be used comprise C, C++, C#, Java®, JavaScript®, Fortran, Ruby, Perl®, Python®, Visual Basic®, hypertext preprocessor (PHP), Microsoft®.NET etc. Other object-oriented, functional, scripting, and/or logical programming languages may also be used. The computer program codes or software programs may be stored on or in one or more mediums as object code. Various aspects of the method and system disclosed herein may be implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. Various aspects of the method and system disclosed herein may be implemented as programmed elements, or non-programmed elements, or any suitable combination thereof. The computer program product disclosed herein comprises one or more computer program codes for implementing the processes of various embodiments.

The present invention can be configured to work in a network environment comprising one or more computers that are in communication with one or more devices via a network. The computers may communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, some examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, some examples of which are disclosed above. While the operating system may differ depending on the type of computer, the operating system will continue to provide the appropriate communications protocols to establish communication links with the network. Any number and type of machines may be in communication with the computers.

Where databases are described such as the image database 814, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries can be different from those disclosed herein. Further, despite any depiction of the databases as tables, other formats including relational databases, object-based models, and/or distributed databases may be used to store and manipulate the data types disclosed herein. Likewise, object methods or behaviors of a database can be used to implement various processes such as those disclosed herein. In addition, the databases may, in a known manner, be stored locally or remotely from a device that accesses data in such a database. In embodiments where there are multiple databases in the system, the databases may be integrated to communicate with each other for enabling simultaneous updates of data linked across the databases, when there are any updates to the data in one of the databases.

The present invention is not limited to a particular computer system platform, processor, operating system, or network. One or more aspects of the present invention may be distributed among one or more computer systems, for example, servers configured to provide one or more services to one or more client computers, or to perform a complete task in a distributed system. For example, one or more aspects of the present invention may be performed on a client-server system that comprises components distributed among one or more server systems that perform multiple functions according to various embodiments. These components comprise, for example, executable, intermediate, or interpreted code, which communicate over a network using a communication protocol. The present invention is not limited to be executable on any particular system or group of systems, and is not limited to any particular distributed architecture, network, or communication protocol.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A computer implemented method for developing a three-dimensional object, said method employing an object development system comprising at least one processor configured to execute computer program instructions for performing said method, said method comprising:

receiving a three-dimensional image in one or more of a plurality of image formats from one or more of a plurality of sources by said object development system;

determining object development requirements and a display type of said received three-dimensional image by said object development system by analyzing said received three-dimensional image;

creating a support structure for said three-dimensional object by said object development system based on said determined object development requirements and said display type of said received three-dimensional image, wherein creating said support structure comprises:

movably attaching a plurality of branching elements with each other using one or more connecting elements; and movably attaching one or more of said branching elements to a support element using said one or more connecting elements, wherein said connecting elements facilitate movement of said movably attached branching elements and said movably attached support element around said one or more connecting elements in said three-dimensional object;

fitting said received three-dimensional image on said created support structure by said object development system;

constructing a multi-layered volumetric three-dimensional image from said received three-dimensional image fitted on said created support structure by said object development system;

segmenting said constructed multi-layered volumetric three-dimensional image into a plurality of three-dimensional printable units by said object development system; and transmitting said three-dimensional printable units to one or more three-dimensional printing devices by said object development system for printing each of said three-dimensional printable units for assembling and developing said three-dimensional object.

2. The computer implemented method of claim 1, wherein said constructed multi-layered volumetric three-dimensional image is segmented free of said created support structure.

3. The computer implemented method of claim 1, further comprising configuring said support structure to incorporate a plurality of control mechanisms and electronic components in said created support structure by said object development system, wherein said control mechanisms are configured to facilitate movement of said three-dimensional object, and wherein said electronic components are configured for creating a multifunctional said three-dimensional object.

4. The computer implemented method of claim 1, further comprising configuring one or more connection grooves in said each of said three-dimensional printable units by said object development system for facilitating insertion of said one or more of connecting elements for assembling and securing said printed each of said three-dimensional printable units.

5. The computer implemented method of claim 1, wherein said connecting elements comprise a hinge, a screw, a three-dimensional fitting plug, a magnet, a cross bar, a dent, and a wedge.

6. The computer implemented method of claim 1, further comprising configuring structural spaces between said three-dimensional printable units by said object development system for precluding deformities in said three-dimensional object during and after assembling of said printed each of said three-dimensional printable units for developing said three-dimensional object.

7. The computer implemented method of claim 1, further comprising identifying and eliminating one of a partial portion and a whole portion of one or more of said three-dimensional printable units from said constructed multi-layered volumetric three-dimensional image by said object development system for optimizing said development of said three-dimensional object.

8. The computer implemented method of claim 1, further comprising labeling said each of said three-dimensional printable units by said object development system using a labeling mechanism for identifying a position of said each of said three-dimensional printable units and tracking positioning of said printed each of said three-dimensional printable units during assembly of said printed each of said three-dimensional printable units.

9. The computer implemented method of claim 1, wherein said transmission of said three-dimensional printable units to said one or more three-dimensional printing devices is performed by said object development system based on a configurable printing sequence for printing said each of said three-dimensional printable units for said assembling and said developing of said three-dimensional object.

10. The computer implemented method of claim 1, further comprising categorizing and grouping said each of said three-dimensional printable units into one or more print files by said object development system for managing said printing of said each of said three-dimensional printable units based on a configurable printing sequence.

11. The computer implemented method of claim 1, further comprising generating a reconfiguration image of said three-dimensional object based on an image of said assembled and said developed three-dimensional object received by said object development system, wherein said reconfiguration image is configured to indicate areas of optimization in said assembled and said developed three-dimensional object.

12. The computer implemented method of claim 11, wherein said reconfiguration image is further configured to indicate application of a protective reinforcing outer layer on an exterior surface of said assembled and said developed three-dimensional object for increasing strength and longevity of said assembled and said developed three-dimensional object.

13. The computer implemented method of claim 1, wherein said object development requirements comprise one or more of functional requirements, structural requirements, esthetic requirements, and mobility requirements for said development of said three-dimensional object.

14. The computer implemented method of claim 1, wherein said three-dimensional printable units comprise one or more of self-similar printable units and dissimilar printable units.

15. An object development system for developing a three-dimensional object, said object development system comprising:
 a non-transitory computer readable storage medium configured to store computer program instructions defined by modules of said object development system;
 at least one processor communicatively coupled to said non-transitory computer readable storage medium, said at least one processor configured to execute said defined computer program instructions;
 said modules of said object development system comprising:
  a data communication module configured to receive a three-dimensional image in one or more of a plurality of image formats from one or more of a plurality of sources;
  an analytics engine configured to determine object development requirements and a display type of said received three-dimensional image by analyzing said received three-dimensional image;
  a structure creation module configured to create a support structure for said three-dimensional object based on said determined object development requirements and said display type of said received three-dimensional image, wherein said created support structure comprises:
   a plurality of branching elements movably attached with each other using one or more connecting elements; and
   a support element movably attached to one or more of said branching elements using said one or more of connecting elements, wherein said connecting elements facilitate movement of said movably attached branching elements and said movably attached support element around said one or more connecting elements in said three-dimensional object;
  an image integration module configured to fit said received three-dimensional image on said created support structure;
  a volumetric image construction module configured to construct a multi-layered volumetric three-dimensional image from said received three-dimensional image fitted on said created support structure;
  an image segmentation module configured to segment said constructed multi-layered volumetric three-dimensional image into a plurality of three-dimensional printable units; and
  a print management module further configured to transmit said three-dimensional printable units to one or more three-dimensional printing devices for printing each of said three-dimensional printable units for assembling and developing said three-dimensional object.

16. The object development system of claim 15, wherein said image segmentation module is configured to segment said constructed multi-layered volumetric three-dimensional image free of said created support structure.

17. The object development system of claim 15, wherein said structure creation module is further configured to configure said support structure to incorporate a plurality of control mechanisms and electronic components in said created support structure, wherein said control mechanisms are configured to facilitate movement of said three-dimensional object, and wherein said electronic components are configured for creating a multifunctional said three-dimensional object.

18. The object development system of claim 15, further comprising an object optimization module configured to configure one or more connection grooves in said each of said three-dimensional printable units for facilitating insertion of said one or more of connecting elements for assembling and securing said printed each of said three-dimensional printable units.

19. The object development system of claim 15, further comprising an object optimization module configured to configure structural spaces between said three-dimensional printable units for precluding deformities in said three-dimensional object during and after assembling of said printed each of said three-dimensional printable units for developing said three-dimensional object.

20. The object development system of claim 15, further comprising an object optimization module configured to identify and eliminate one of a partial portion and a whole portion of one or more of said three-dimensional printable units from said constructed multi-layered volumetric three-dimensional image for optimizing said development of said three-dimensional object.

21. The object development system of claim 15, further comprising a labeling module configured to label said each of said three-dimensional printable units using a labeling mechanism for identifying a position of said each of said three-dimensional printable units and tracking positioning of said printed each of said three-dimensional printable units during assembly of said printed each of said three-dimensional printable units.

22. The object development system of claim 15, wherein said print management module is configured to transmit said three-dimensional printable units to said one or more three-dimensional printing devices based on a configurable printing sequence for printing said each of said three-dimensional printable units for said assembling and said developing of said three-dimensional object.

23. The object development system of claim 15, wherein said print management module is further configured to categorize and group said each of said three-dimensional printable units into one or more print files for managing said printing of said each of said three-dimensional printable units based on a configurable printing sequence.

24. The object development system of claim 15, further comprising an object optimization module configured to generate a reconfiguration image of said three-dimensional object based on an image of said assembled and said developed three-dimensional object received by said data communication module, wherein said reconfiguration image is configured to indicate areas of optimization in said assembled and said developed three-dimensional object.

25. The object development system of claim 24, wherein said reconfiguration image is further configured to indicate application of a protective reinforcing outer layer on an exterior surface of said assembled and said developed three-dimensional object for increasing strength and longevity of said assembled and said developed three-dimensional object.

26. The object development system of claim 15, wherein said object development requirements comprise one or more of functional requirements, structural requirements, esthetic requirements, and mobility requirements for said development of said three-dimensional object.

27. A computer program product comprising a non-transitory computer readable storage medium, said non-transitory computer readable storage medium storing computer program codes that comprise instructions executable by at least one processor, said computer program codes comprising:
   a first computer program code for receiving a three-dimensional image in one or more of a plurality of image formats from one or more of a plurality of sources;
   a second computer program code for determining object development requirements and a display type of said received three-dimensional image by analyzing said received three-dimensional image;
   a third computer program code for creating a support structure for a three-dimensional object based on said determined object development requirements and said display type of said received three-dimensional image, wherein creating said support structure comprises:
      movably attaching a plurality of branching elements with each other using one or more connecting elements; and
      movably attaching one or more of said branching elements to a support element using said one or more connecting elements, wherein said connecting elements facilitate movement of said movably attached branching elements and said movably attached support element around said one or more connecting elements in said three-dimensional object;
   a fourth computer program code for fitting said received three-dimensional image on said created support structure;
   a fifth computer program code for constructing a multi-layered volumetric three-dimensional image from said received three-dimensional image fitted on said created support structure;
   a sixth computer program code for segmenting said constructed multi-layered volumetric three-dimensional image into a plurality of three-dimensional printable units; and
   a seventh computer program code for transmitting said three-dimensional printable units to one or more three-dimensional printing devices for printing each of said three-dimensional printable units for assembling and developing said three-dimensional object.

28. The computer program product of claim 27, further comprising a ninth computer program code for configuring said support structure to incorporate a plurality of control mechanisms and electronic components in said created support structure, wherein said control mechanisms are configured to facilitate movement of said three-dimensional object, and wherein said electronic components are configured for creating a multifunctional said three-dimensional object.

29. A computer implemented method for developing a three-dimensional object, said method employing an object development system comprising at least one processor configured to execute computer program instructions for performing said method, said method comprising:
   receiving a three-dimensional image in one or more of a plurality of image formats from one or more of a plurality of sources by said object development system;
   determining object development requirements and a display type of said received three-dimensional image by said object development system by analyzing said received three-dimensional image;
   creating a support structure for said three-dimensional object by said object development system based on said determined object development requirements and said display type of said received three-dimensional image, wherein creating said support structure comprises:
      movably attaching a plurality of branching elements with each other using one or more hinges; and
      movably attaching one or more of said branching elements to a support element using said one or more hinges, wherein said hinges facilitate movement of said movably attached branching elements and said movably attached support element around said one or more connecting elements in said three-dimensional object;
   generating and controlling said movement of said three-dimensional object using one or more motion control elements;
   fitting said received three-dimensional image on said created support structure by said object development system;
   constructing a multi-layered volumetric three-dimensional image from said received three-dimensional image fitted on said created support structure by said object development system;
   segmenting said constructed multi-layered volumetric three-dimensional image into a plurality of three-dimensional printable units by said object development system; and
   transmitting said three-dimensional printable units to one or more three-dimensional printing devices by said object development system for printing each of said three-dimensional printable units for assembling and developing said three-dimensional object.

* * * * *